United States Patent
Tokoro et al.

(10) Patent No.: US 7,457,124 B2
(45) Date of Patent: Nov. 25, 2008

(54) ELECTRONIC APPARATUS

(75) Inventors: Masataka Tokoro, Tachikawa (JP); Hiroaki Itakura, Ome (JP); Tetsuya Kugimiya, Kawasaki (JP); Noriyasu Kawamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 327 days.

(21) Appl. No.: 11/314,109

(22) Filed: Dec. 20, 2005

(65) Prior Publication Data

US 2006/0133026 A1    Jun. 22, 2006

(30) Foreign Application Priority Data

Dec. 22, 2004    (JP)    ............... 2004-370856

(51) Int. Cl.
*H05K 7/20*    (2006.01)
(52) U.S. Cl. .............. 361/715; 361/752; 361/800; 312/223.2; 312/257.1
(58) Field of Classification Search ............... 361/683, 361/752, 715; 16/366, 342; 312/223, 257.1; 463/37, 1
See application file for complete search history.

(56) References Cited

U.S. PATENT DOCUMENTS

| | | | | |
|---|---|---|---|---|
| 5,623,390 | A | * | 4/1997 | Noda et al. ............... 361/679 |
| 6,101,088 | A | * | 8/2000 | Nakajima et al. ........... 361/686 |
| 6,336,614 | B1 | * | 1/2002 | Kwitek ..................... 248/118 |
| 6,693,795 | B2 | * | 2/2004 | Tanaka et al. .............. 361/683 |
| D515,089 | S | * | 2/2006 | Ho ......................... D14/365 |
| D533,552 | S | * | 12/2006 | Kuroiwa et al. ............ D14/346 |
| 2002/0057813 | A1 | | 5/2002 | Burleson et al. |

OTHER PUBLICATIONS

English Translation of Feb. 16, 2007 office action in Chinese counterpart application.

* cited by examiner

*Primary Examiner*—Tuan T. Dinh
*Assistant Examiner*—Hung S Bui
(74) *Attorney, Agent, or Firm*—Blakely Sokoloff Taylor & Zafman, LLP

(57) ABSTRACT

An electronic apparatus includes a main body housing having a corner portion in its rear, a display section, and a hinge device which rotatively movably connects the display section to the main body housing. The corner portion projects outward more than a side wall of the display section placed in a closed position with respect to the main body housing.

10 Claims, 4 Drawing Sheets

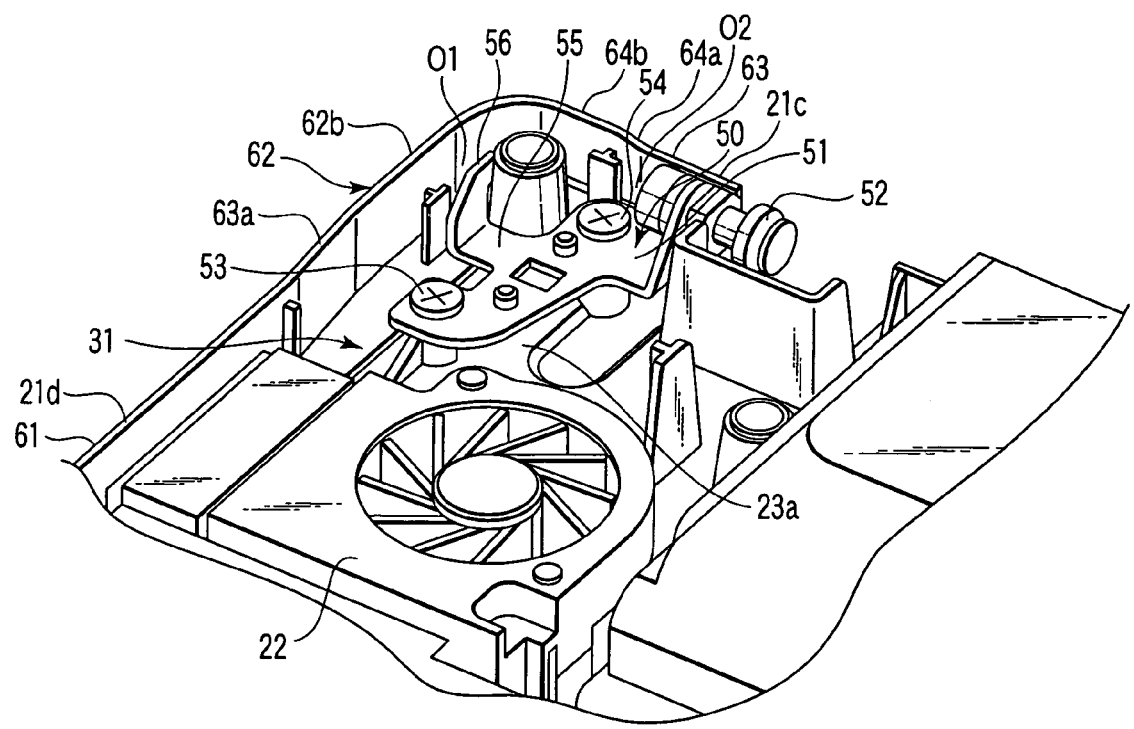
F I G. 4
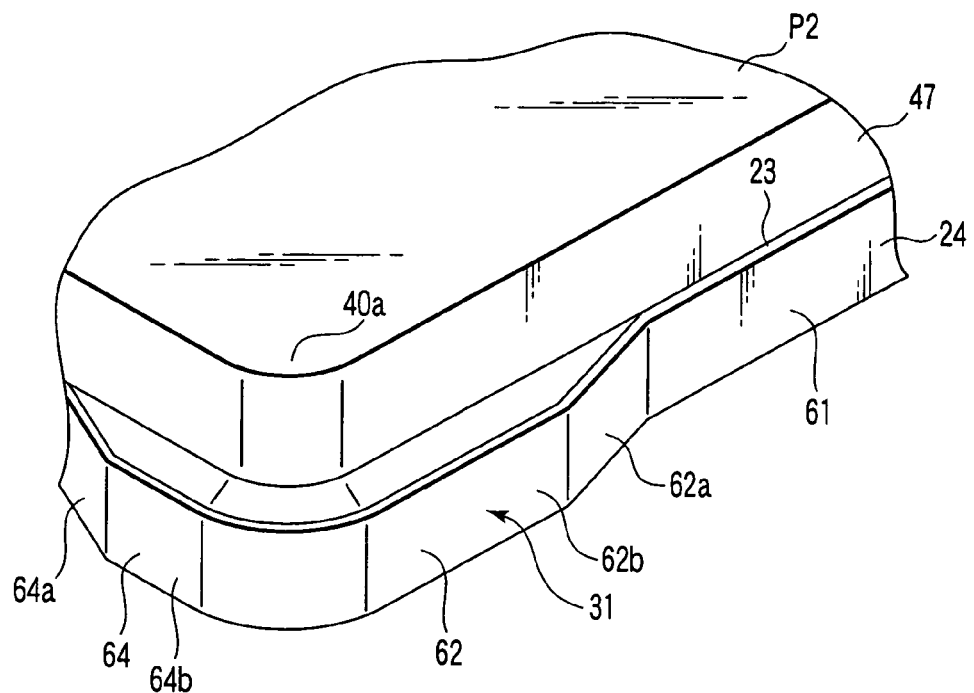
F I G. 5

ELECTRONIC APPARATUS

CROSS-REFERENCE TO RELATED APPLICATIONS

This application is based upon and claims the benefit of priority from prior Japanese Patent Application No. 2004-370856, filed Dec. 22, 2004, the entire contents of which are incorporated herein by reference.

BACKGROUND

1. Field

The present invention relates to an electronic apparatus such as a notebook computer, and in particular, to a housing structure for the electronic apparatus.

2. Description of the Related Art

In recent years, there has been a demand for reducing the weights and thicknesses of electronic apparatuses such as notebook computers in order to improve their portability.

However, the electronic apparatus may be dropped or may be collided with desk or the like. Thus, the portable electronic apparatuses are desired to have a housing with an improved strength.

To improve the strength of the housing, a protection structure for the housing has been proposed which comprises protectors provided at corners of the housing and consisting of cushion materials. For example, U.S. Pat. No. 5,583,742 discloses such a housing.

However, owing to its improved strength, the housing is subjected directly to a shock resulting from a fall of the notebook computer or its collision against a desk or the like, without absorbing the shock.

The shock may damage devices such as a substrate which are accommodated in the housing. It is not preferable to damage the device such as a substrate which is accommodated in the housing.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a perspective view of the left corner portion of the notebook computer shown in FIG. 1 with the upper case of the main body housing removed; and FIG. 5 is a perspective view showing the neighborhood of the left corner portion of the notebook computer when a display unit shown in FIG. 1 is placed in its closed position.

DETAILED DESCRIPTION

With reference to FIGS. 1 to 5, description will be given of an electronic apparatus in accordance with an embodiment of the present invention, taking the case of a notebook computer.

Figure 1:
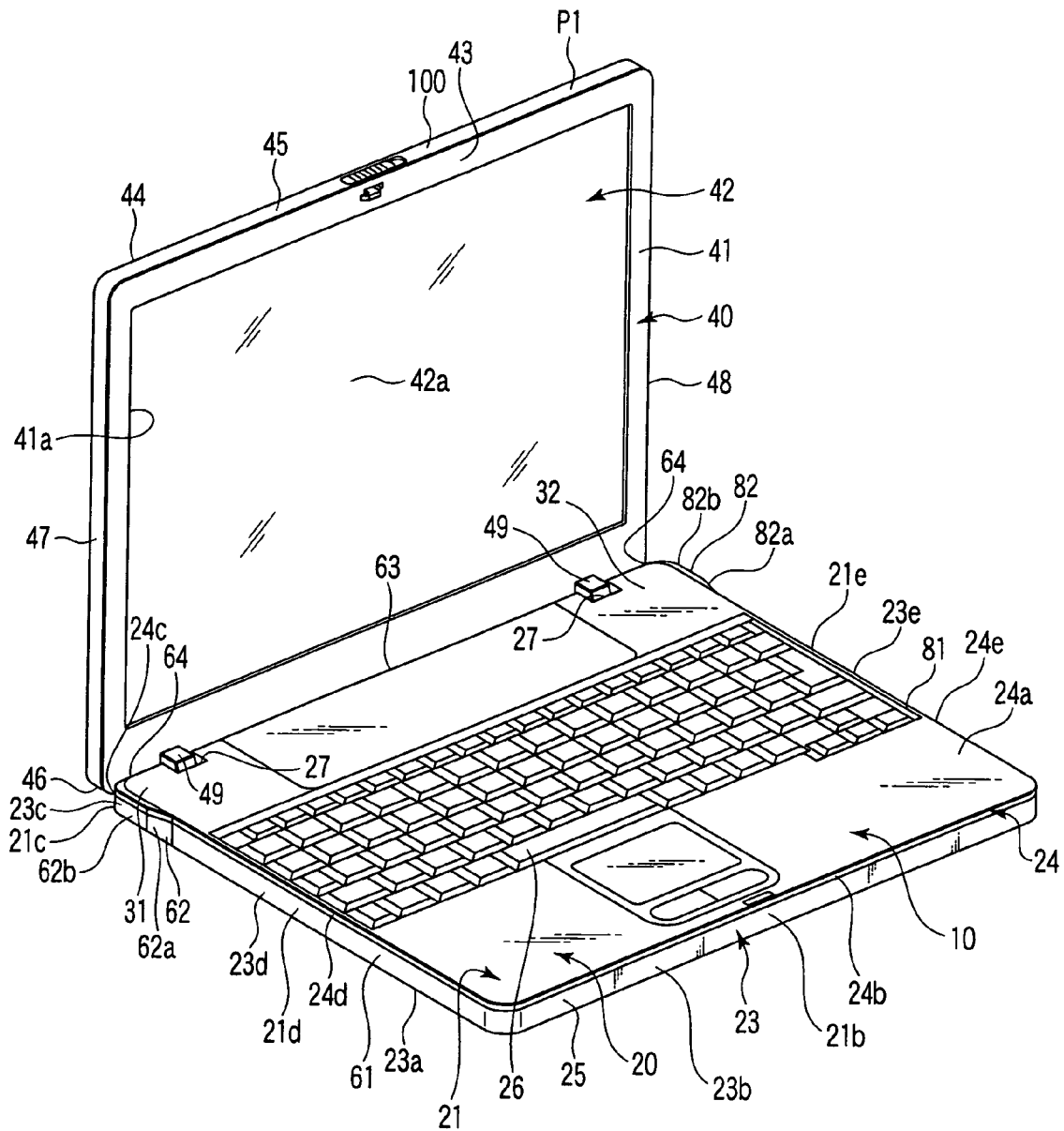
FIG. 1 is a perspective view of a notebook computer in accordance with a first embodiment of the present invention.

FIG. 1 shows a notebook computer 10. As shown in FIG. 1, the notebook computer 10 comprises a computer main body 20 and a display section 40.

The computer main body 20 comprises a main body housing 21 and devices such as a fan device 22 and a substrate which are accommodated in the main body housing 21. The main body housing 21 is shaped like a flat box. The main body housing 21 comprises a lower case 23 and an upper case 24.

The lower case 23 has a bottom wall 23a, a front wall 23b, a rear wall 23c, a left wall 23d, and a right wall 23e.

The upper case 24 is attached to the lower case 23 so as to cover an opening formed at an upper end of the lower case 23. The upper case 24 has an upper wall 24a, a front wall 24b, a rear wall 24c, a left wall 24d, and a right wall 24e. The upper wall 24a is provided with a keyboard 26.

With the upper case 24 attached to the lower case 23, the front walls 23b and 24b align with each other. Similarly, the rear walls 23c and 24c align with each other. Similarly, the left walls 23d and 24d align with each other. Likewise, the right walls 23e and 24e align with each other.

The front walls 23b and 24b constitute a front wall 21b of the main body housing 21. The rear walls 23c and 24c constitute a rear wall 21c of the main body housing 21. The left walls 23d and 24d constitute a left wall 21d of the main body housing 21. The right walls 23e and 24e constitute a right wall 21e of the main body housing 21.

The front wall 21b, the rear wall 21c, the left wall 21d, and the right wall 21e constitute a side wall 25 of the main body housing in accordance with the present invention. The side wall 25 means a peripheral wall of the main body housing 21.

A left corner portion 31 is formed at a rear width-wise left end of the main body housing 21. A right corner portion 32 is formed at a rear width-wise right end of the main body housing 21. In the left corner portion 31, the rear wall 21c and the left wall 21d are continuous. In the right corner portion 32, the rear wall 21c and the right wall 21e are continuous.

The display section 40 comprises a display section housing 41 and a liquid crystal display panel 42. The liquid crystal display panel 42 is accommodated in the display section housing 41. The liquid crystal display panel 42 has a screen 42a that displays images. The screen 42a is exposed from the display section housing 41 through an opening 41a formed in the front of the display section housing 41.

The display section 40 is connected to a computer main body 20 by hinge devices 50 described below. The display section 40 is rotatively moveable between an open position P1 and a closed position P2 with respect to the computer main body 20.

In the open position P1, the display section 40 is upright from the computer main body 20, exposing the keyboard 26 and the screen 42a. FIG. 1 shows the display section 40 in the open position P1. In the closed position P2, the display section 40 lies over the computer main body 20 so as to cover the keyboard 26 from above. FIG. 5 shows the display section 40 in the closed position P2.

The display section housing 41 has a first wall 43, a second wall 44, a third wall 45, a fourth wall 46, a left wall 47, and a right wall 48. The first wall 43 faces frontward when the display section 40 is in the open position P1. An opening 41a is formed in the first wall 43. The second wall 44 faces rearward when the display section 40 is in the open position P1. The third wall 45 faces upward when the display section 40 is in the open position P1. The fourth wall 46 faces downward when the display section 40 is in the open position P1.

Accordingly, when the display section 40 is in the closed position P2, the second wall 44 faces upward. When the display section 40 is in the closed position P2, the third wall 45 faces frontward. When the display section 40 is in the closed position P2, the fourth wall 46 faces rearward. The third and fourth walls 45 and 46 and the left and right walls 47 and 48 constitute a side wall 100 of the display section housing 41. The side wall 100 is a peripheral wall of the display section housing 41.

Figure 2:
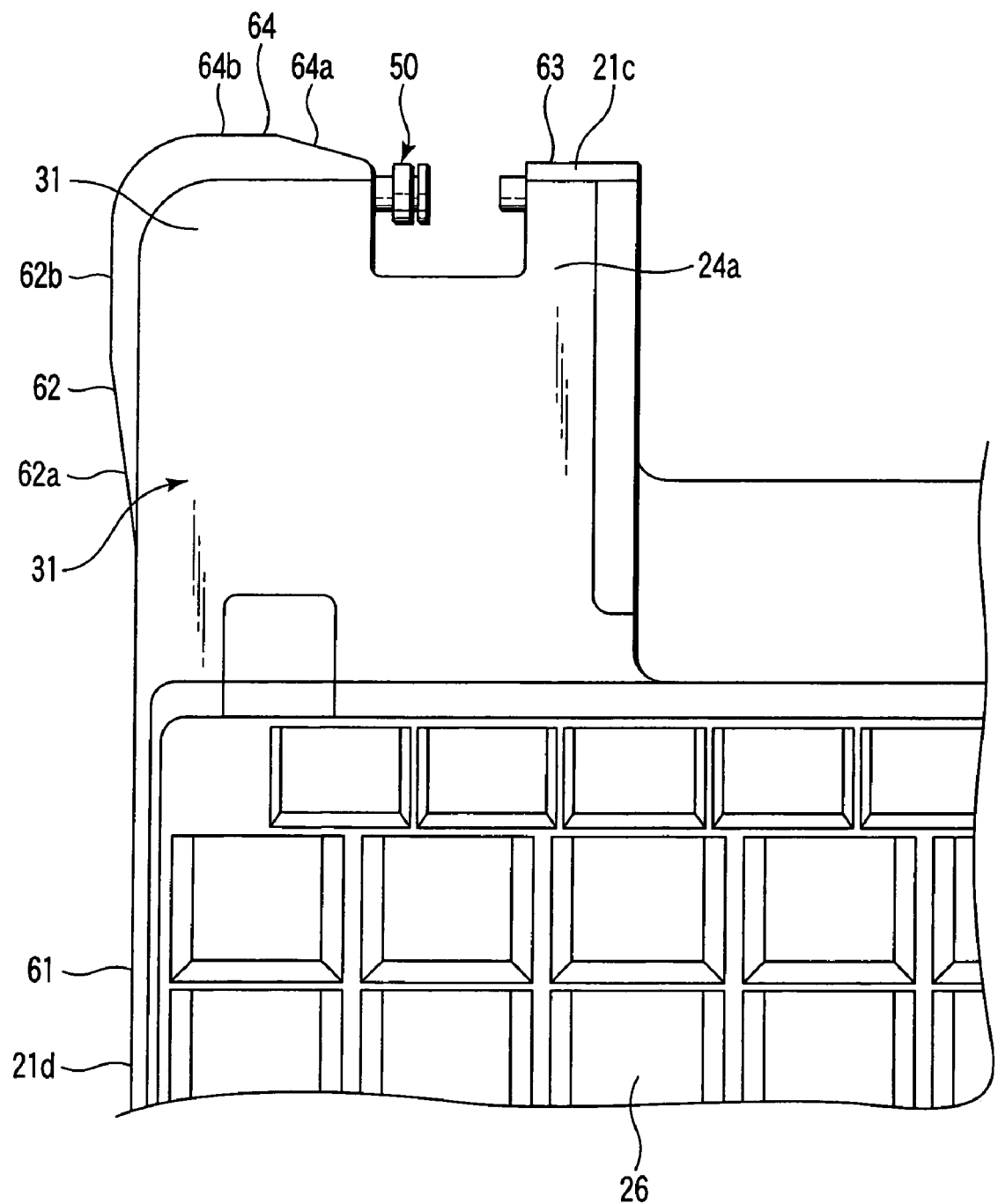
FIG. 2 is an enlarged plan view showing a left corner portion of the notebook computer shown in FIG. 1.
Figure 3:
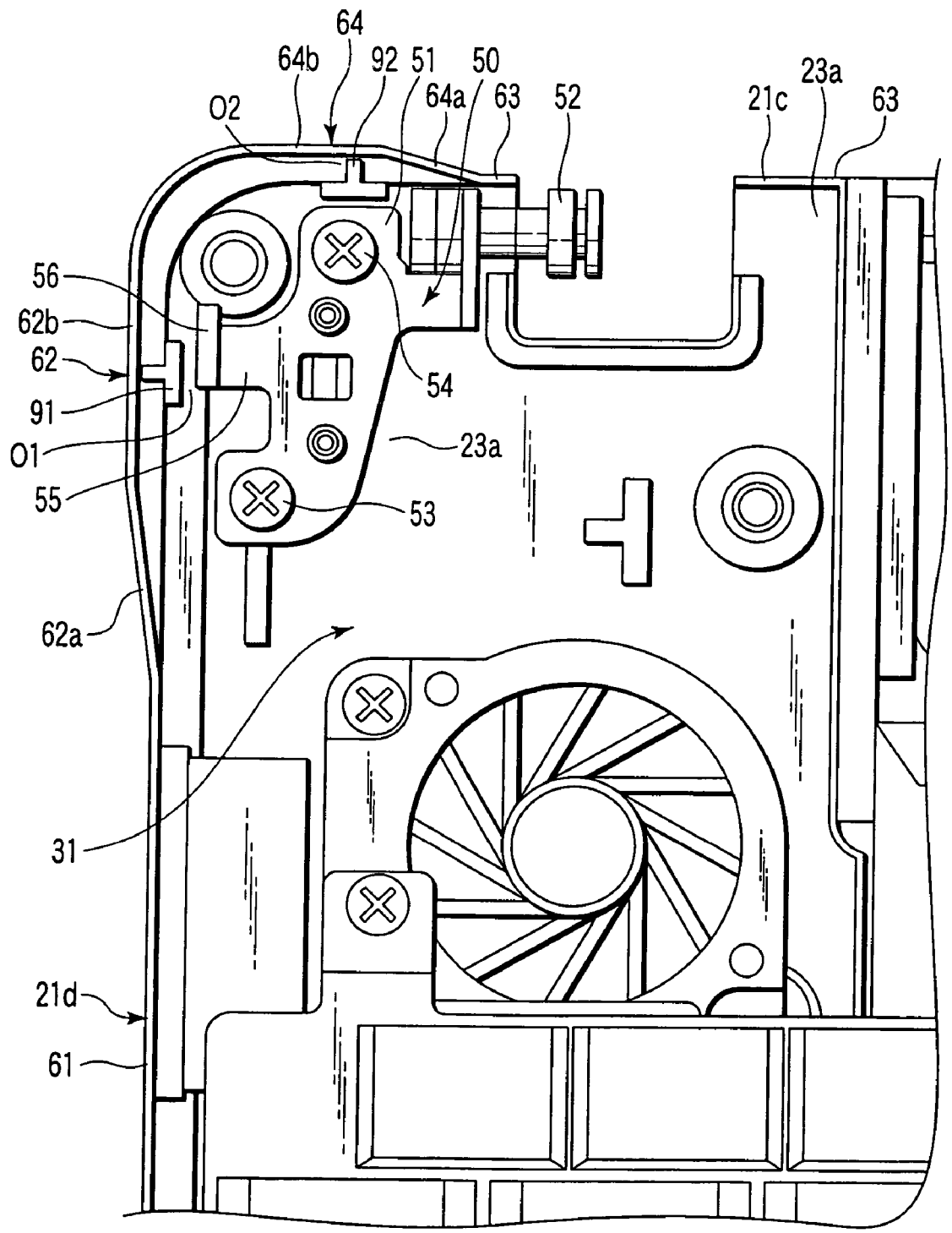
FIG. 3 is a plan view of the left corner portion of the notebook computer shown in FIG. 1 with an upper case of a main body housing removed.

FIG. 2 is an enlarged plan view showing the left corner portion 31 of the main body housing 21 from which the display section 40 has been removed. FIG. 3 is a plan view showing the interior of the left corner portion 31 of the main body housing 21 from which the upper case 24 and the display section 40 have been removed. FIG. 4 is a perspective view showing the interior of the left corner portion 31 of the main body housing 21 from which the upper case 24 and the display section 40 have been removed. As shown in FIGS. 2, 3, and 4, the hinge device 50 is accommodated in the left corner portion 31.

In the present embodiment, the hinge device 50 is also accommodated in the right corner portion 32. The hinge devices 50 accommodated in the left and right corner portions 31 and 32 may have the same structure.

The hinge device 50 comprises a bracket 51 and a shaft 52. As shown in FIG. 3, the bracket 51 is fixed to the bottom wall 23a of the main body housing 21 using, for example, screws 53 and 54.

The bracket 51 has an extending portion 55 and an upright wall 56. The extending portion 55 extends toward the left wall 21d. The upright wall 56 stands up from the tip of the extending portion 55 substantially parallel to the left wall 21d. A first gap O1 is created between the upright wall 56 and the left wall 21d. A second gap O2 is created between the bracket 51 and the rear wall 21c.

The extending portion 55 of the bracket 51, accommodated in the right corner portion 32, extends toward the right wall 21e. Similarly, the upright wall 56 of the bracket 51, accommodated in the right corner portion 32, stands up substantially along the right wall 21e. The first gap O1 is also formed between the right wall 21e and the upright wall 56 of the bracket 51, accommodated in the right corner portion 32. The second gap O2 is similarly formed.

The shaft 52 is connected to the display section 40 and bracket 51. One end of the shaft 52 is connected to the bracket 51. As shown in FIG. 1, a hinge portion 49 is provided at a lower end (located at the fourth wall 46 side) of the display section housing 41 at a position corresponding to the hinge device 50.

The hinge portion 49 projects from the fourth wall 46. Thus, a notch portion 27 is formed in the main body housing 21 so that the hinge portion 49 can be accommodated in the notch portion 27. As shown in FIG. 3, the shafts 52 extend from the left and right corner portions 31 and 32 into the notch portion 27. The other end of the shaft 52 is connected to the hinge portion 49. This structure enables the display section 40 to move rotatively with respect to the computer main body 20.

Now, a detailed description will be given of the structure of the left and right corner portions 31 and 32. First, the structure of the left corner portion 31 will be described. As described in FIGS. 3 and 4. The left wall 21d has a first left wall 61 and a second left wall 62. The second left wall 62 forms a part of the left corner portion 31. The first left wall 61 corresponds to the entire left wall 21d except for the second left wall 62. That is, the first left wall 61 is located in front of the left corner portion 31. The first left wall 61 is a first side wall in accordance with the present invention. The second left wall 62 is a second side wall in accordance with the present invention.

As shown in FIG. 1, the first left wall 61 extends substantially along a front-to-back direction. As shown in FIGS. 3 and 4, the second left wall 62 has a tapered portion 62a and a parallel portion 62b. The tapered portion 62a is contiguously connected to the first left wall 61. The tapered portion 62a is inclined externally rearward. The parallel portion 62b is contiguously connected to a rear end of the tapered portion 62a. The parallel portion 62b extends substantially along the front-to-back direction. Accordingly, the parallel portion 62b is located outside the first left wall 61.

The rear wall 21c has a first rear wall 63 and a second rear wall 64. The second rear wall 64 forms a part of the left or right corner portion 31 or 32. The first rear wall 63 corresponds to the entire rear wall 21c except for the second rear wall 64.

The first rear wall 63 extends substantially along the width direction of the main body housing 21. The second rear wall 64 has a tapered portion 64a and a parallel portion 64b. The tapered portion 64a is contiguously connected to the first rear wall 63. The tapered portion 64a projects gradually rearward as it approaches its left end; the tapered portion 64a forms a part of the left corner portion 31.

The parallel portion 64b is contiguously connected to the tapered portion 64a. The parallel portion 64b is substantially parallel to the width direction. The parallel portion 62b of the second left wall 62 is contiguously connected to the parallel portion 64b of the second rear wall 64. The connection between the parallel portion 62d of the second left wall 62 and the parallel portion 64b of the second rear wall 64 appears like a circular arc as viewed from above.

The fan device 22 is accommodated near the left corner portion 31.

Now, the right corner portion 32 will be described. The right corner portion 32 is configured so that the left and right corner portions 31 and 32 are laterally symmetric.

As shown in FIG. 1, the right wall 21e has a first right wall 81 and a second right wall 82. The second right wall 82 forms a part of the right corner portion 32. The first right wall 81 corresponds to the entire right wall 21e except for the second right wall 82. That is, the first right wall 81 is located in front of the right corner portion 32. The first right wall 81 is the first side wall in accordance with the present invention. The second right wall 82 is the second side wall in accordance with the present invention.

The first right wall 81 extends substantially along the front-to-back direction of the main body housing 21. The second right wall 82 has a tapered portion 82a and a parallel portion 81b. The tapered portion 82a is contiguously connected to the first right wall 81. The tapered portion 82a projects gradually circumferentially outward as it approaches its rear end. The parallel portion 82b is contiguously connected to the rear end of the tapered portion 82a. The parallel portion 82b extends in the front-to-back direction. Accordingly, the parallel portion 82b is located outside the first right wall 81.

The tapered portion 64a of the second rear wall 64, which forms the right corner portion 32, projects rearward as it approaches its right end. The parallel portion 82b of the second right wall 82 is contiguously connected to the parallel portion 64b of the second rear wall 64, which forms a part of the right corner portion 32. The connection between the parallel portion 82b of the second right wall 82 and the parallel portion 64b of the second rear wall 64 appears like a circular arc as viewed from above.

The left walls 23d and 24d are formed so as to correspond to the first and second walls 61 and 62. The right walls 23e and 24e are formed so as to correspond to the first and second right walls 81 and 82. The rear walls 23c and 24c are formed so as to correspond to the first rear walls 63 and 64. FIG. 5 is a perspective view of the left corner portion 31 with the display section 40 placed in the closed position P2, as viewed from behind. As partly shown in FIG. 5, with the display section 40 placed in the closed position P2, an outer surface of the first left wall 61 aligns substantially with an outer surface of the left wall 47 of the display section housing 41 in a vertical direction. Further, although not shown, an outer surface of the first right wall 81 aligns substantially with an outer surface of the right wall 48 of the display section housing 41 in the vertical direction. With the display section 40 placed in the closed position P2, an outer surface of the first rear wall 63 aligns substantially with an outer surface of the fourth wall 46 of the display section housing 41 in the vertical direction.

An outer surface of the second left wall 62 projects circumferentially outward more than an outer surface of the left wall 47 of the display section housing 41. An outer surface of the second rear wall 64 projects circumferentially outward more than an outer surface of the fourth wall 46 of the display section housing 41. That is, the left corner portion 31 projects circumferentially outward more than a corner portion 40a of the display section 40 which aligns with the left corner portion 31 in the vertical direction.

Like the left corner portion 31, the right corner portion 32 projects circumferentially outward more than a corner portion of the display section 40 which aligns with the right corner portion 32 in the vertical direction.

The first gap O1 is created between the upright wall 56 and each of the parallel portions 62b and 82b of the second left and right walls 62 and 82. The second gap O2 is created between the parallel portion 64b of the second rear wall 64 and the bracket 51.

As shown in FIGS. 3 and 4, reinforcing walls 91 and 92 are formed on the bottom wall 23a of the main body housing 21. The first reinforcing wall 91 is placed in the first gap O1. The first reinforcing wall 91 projects upward. The second reinforcing wall 92 is placed in the second gap O2. The second reinforcing wall 92 projects upward. The reinforcing walls 91 and 92 have a substantially T-shaped cross section.

In this configuration, the left and right corner portions 31 and 32 projects circumferentially outward. Consequently, even if the notebook computer 10 falls, then within the main body housing 21, either the left or right corner portion 31 or 32 is likely to come first into contact with the floor or the like.

Accordingly, either the left or right corner portion 31 or 32 absorbs a shock resulting from a fall. Therefore, even if the notebook computer 10 falls, it is possible to reduce the magnitude of a shock transmitted to devices such as the fan device 22 which are accommodated in the main body housing 21. This in turn makes it possible to suppress damage to the devices such as the fan device 22.

Further, the left and right corner portions 31 and 32 projects circumferentially outward more than the display section 40 placed in the closed position P2. Accordingly, even if the notebook computer 10 falls, the left and right corner portions 31 and 32 are likely to come into contact with the floor or the like before the parts of the main body housing 21 except the left and right corner portions 31 and 32 as well as the display section 40 do. That is, the present invention can inhibit the parts of the main body housing 21 except the left and right corner portions 31 and 32 as well as the display section 40 from coming first into contact with the floor or the like.

Thus, either the left or right corner portion 31 or 32 absorbs a shock resulting from a fall. Therefore, even if the notebook computer 10 falls, it is possible to reduce the magnitude of a shock transmitted to the devices such as the fan device 22 which are accommodated in the main body housing 21 and to the display section 40. This in turn makes it possible to suppress damage to the devices such as the fan device 22 and to the display section 40.

Further, the formation of the gaps O1 and O2 precludes a shock resulting from a fall from being easily transmitted to the hinge devices 50. This suppresses damage to the hinge devices 50.

Furthermore, the reinforcing walls 91 and 92 functions as interfering materials. This inhibits the hinge devices 50 from colliding against the second left and right walls 62 and 82 and second rear wall 64.

This inhibits the second left and right walls 62 and 82 and second rear wall 64 from being damaged as a result of contact with the hinge devices 50.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
a main body housing including a side wall and a rear wall forming a corner portion;
a display section; and
a hinge device which rotatively connects the display section to the main body housing, the hinge device being laced in the corner portion,
wherein both the side wall and the rear wall forming the corner portion project outwardly more than a side of the display section placed in a closed position with respect to the main body housing.

2. An electronic apparatus comprising;
a main body housing having a corner portion in its rear;
a display section including a first wall and a second wall; and
a hinge device rotatively coupled to the display section, the hinge device being placed in the corner portion,
wherein the main body housing includes:
a first side wall, a second side wall which is contiguous to the first side wall and which projects outward more than the first side wall when the display section is placed in a closed portion, a first rear wall, and a second rear wall which is contiguous to the first rear wall and which projects outward more than the first rear wall and the second wall when the display section is placed in a closed position, the second rear wall forming the corner portion together with the second side wall.

3. The electronic apparatus according to claim 2, wherein the hinge device is placed in the corner portion,
a first gap is created between the hinge device and the second side wall, and
a second gap is created between the hinge device and the second rear wall.

4. The electronic apparatus according to claim 3, wherein a first reinforcing wall is formed in the main body housing and arranged in the first gap, and
a second reinforcing wall is formed in the main body housing and arranged in the second gap.

5. An electronic apparatus comprising:
a main body housing including portions of a first side wall and a rear wall forming a first corner portion;
a display section including a display and a display section housing, the display section housing including a first wall and a second wall; and a hinge device rotationally coupling the display section housing to the main body housing, the hinge device being placed in the first corner portion, wherein the portions of the first side wall and the rear wall outwardly project more than the first wall and the second wall of the display section housing when the display section housing is placed in a closed position with respect to the main body housing.

6. The electronic apparatus according to claim 5 further comprising a first reinforcing wall formed with a gap between the hinge device and the portion of the first side wall.

7. The electronic apparatus according to claim 6 further comprising a second reinforcing wall formed with a gap between the hinge device and the portion of the rear wall of the main body housing.

8. The electronic apparatus according to claim 5, wherein the portions of the first side wall and the rear wall of the main body housing are continuous.

9. The electronic apparatus according to claim 5 further comprising a second hinge device placed in a second corner portion formed by portions of the rear wall and a second side wall, portions of the rear wall and the second side wall outwardly project more than the second wall and a third wall of the display section housing.

10. The electronic apparatus according to claim 5, wherein the corner portion formed by the portions of the first side wall and the rear wall is situated at one of a rear width-wise left ad and a rear width-wise right end of the main body housing.

* * * * *